UNITED STATES PATENT OFFICE.

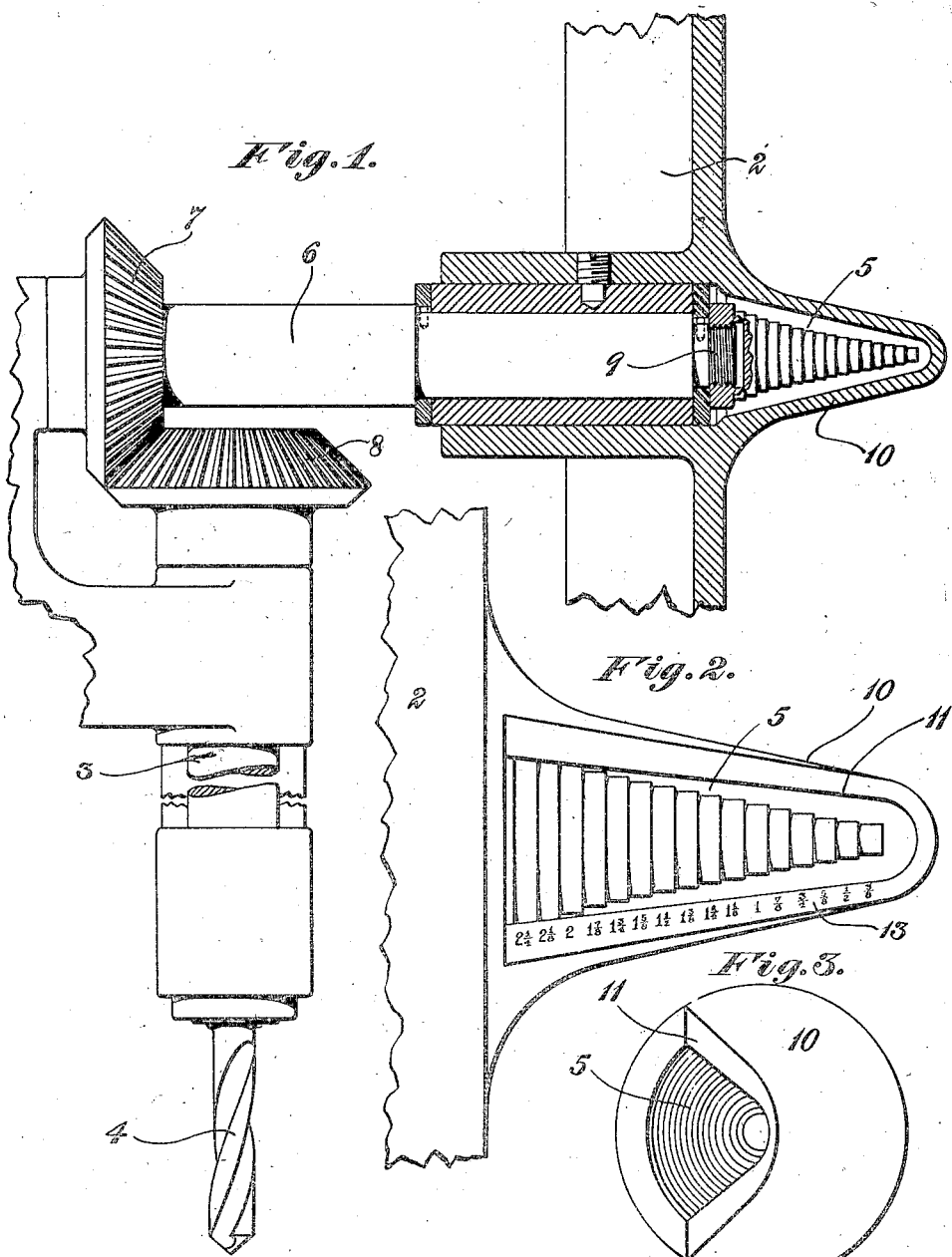

BENGT M. W. HANSON AND WILLARD T. SEARS, OF HARTFORD, CONNECTICUT, ASSIGNORS TO PRATT & WHITNEY COMPANY, OF HARTFORD, CONNECTICUT, A CORPORATION OF NEW JERSEY.

SPEED-INDICATING MECHANISM.

1,086,528.   Specification of Letters Patent.   Patented Feb. 10, 1914.

Application filed January 25, 1913. Serial No. 744,117.

*To all whom it may concern:*

Be it known that we, BENGT M. W. HANSON and WILLARD T. SEARS, citizens of the United States, residing at Hartford, in the county of Hartford and State of Connecticut, have invented certain new and useful Improvements in Speed-Indicating Mechanism, of which the following is a specification.

This invention relates to speed-indicating mechanism, one of the primary objects of the invention being to provide simple and effective means by which with the aid of a speedometer, cut-meter or equivalent device, the speed of rotation of a tool or analogous part, can be accurately and quickly determined.

In the drawings accompanying and forming part of the present specification we have shown in detail one of the several convenient forms of embodiment of the invention, which to enable those skilled in the art to practise the same will be set forth fully in the following description. We do not restrict ourselves, however, to this disclosure; we may depart therefrom in several respects within the scope of the invention defined by our claims.

Referring to said drawings: Figure 1 is a sectional elevation of a machine equipped with speed-indicating means involving our invention. Fig. 2 is an elevation of a gage member, its casing and portion of the framing. Fig. 3 is a view as seen from the right in Fig. 2.

Like characters refer to like parts throughout the several views, which are on different scales.

Our speed indicating mechanism can be used with advantage in connection with widely-different types of machines, being intended principally to indicate, with the aid of a suitable device, the speed of rotation of a tool. The mechanism is of particular utility when employed in conjunction with a tool having an irregular or interrupted surface, such as a drill or milling cutter, these being two types of tools, and which owing to their form cannot have a speed-measuring device applied to their peripheries. It is the custom ordinarily when it is desired to ascertain the surface or peripheral speed of a tool to obtain the revolutions per minute of the spindle to which said tool is connected and then being given the diameter of said tool, to compute from the tool, the desired information. We provide means by which can be instantly and correctly determined the peripheral speed of a tool, and this is accomplished by providing a gage member rotative with the tool-spindle at a definite speed proportion therewith. When we indicate this gage member is rotative with the spindle we do not necessarily mean to imply that it is driven thereby, although this is our preferred relation. Ordinarily the gage member is located at a point remote from the tool so as to be out of the range of the chips being cut or the oil employed in lubricating the tool.

In Fig. 1 of the drawings we have represented a portion of a radial-drill and will hereinafter briefly describe the same with the object of showing the purpose of the speed-indicating mechanism. As will be clear we do not restrict ourselves in this particular as the appliance can be used equally as well in conjunction with other kinds of metal-working machines, those working on wood and any other like fields where the objects stated are requisite. Nor do we limit ourselves to any particular form of gage-member but have secured excellent effects by providing one of conical form, thereby adapting the gage member for coaction with tools of various diameters. When the gage member is stepped, each step corresponds with a tool of a certain size, although the steps need not be of the same diameter as the tools which are coactive respectively therewith.

In Fig. 1 of the drawings 2 indicates the horizontal arm which extends from the vertical column (not shown) of a radial drill, said arm 2 being provided with the spindle 3 provided with means as is customary to removably receive and securely hold a drill as 4. As already observed the gage-member operatively associated with the spindle 3 may vary decidedly as to character, although the conical one shown and denoted in a general way by 5 has met all the desired conditions. This gage member 5 is operative with the drill spindle 3 and necessarily with the drill 4 carried thereby, this condition in the showing made being accomplished by driving the gage member 5 from the spindle and any suitable means may be utilized for this purpose. While in the organization illustrated the gage member 5 is driven at the same speed as the spindle, this is not material, as their speeds may be different. Extending transversely of the arm 2 constituting a convenient framing for supporting the different parts shown, is a shaft 6, said arm having suitable bearings to support said shaft which as illustrated, is provided at its inner end with a bevel gear 7 fastened thereto and in mesh with a like gear 8 rotative with the spindle 3. The shaft 6 at its outer end is threaded as at 9 to receive the gage-member 5, this presenting one convenient way of connecting said gage member with said shaft. The arm or frame member 2 is equipped with a shell or guard 10 for the gage-member, of the same general shape as the latter, said shell or guard being slotted as at 11 sufficiently to permit the application of a speedometer or cut-meter to the appropriate peripheral portion of the conical gage-member to determine thereby the speed of rotation of the particular tool rotatively connected with the spindle 3. The gage-member 5 when of conical form has preferably steps, each step being cylindrical, and although there are sixteen of such steps shown, this number is arbitrary, the number of steps depending generally upon the number of sizes of drills or like tools. The guard 10 has on it a scale 13 with marks reading from ⅜ to 2¼, the numbers being ⅛ apart and indicating tool sizes. The drill 4 is a 1⅜ inch one. In the organization shown the step of the conical gage member 5 opposite the 1⅜ mark on the scale 13 coöperates with this particular drill, and although in this particular organization and as a matter of preference and advantage, the peripheral speed of this 1⅜ step or indicating portion is the same as that of the drill 4, this is not essential in all cases, as such speeds might vary and a correct reading in this event, obtained by the use of an appropriate cut meter or otherwise. It will be seen that each indicating-portion of the gage member is smooth and uninterrupted which is advantageous in as by this, extreme accuracy is assured.

It will be clear that the gage member has means at different points thereof for driving a speed measuring device at various speeds without changing the speed of rotation of the spindle.

What I claim is:

1. A gage-member having a tool-speed-indicating portion, combined with a spindle for receiving tools of different sizes, and means operative with the spindle, for driving said gage-member, to cause the indicating portion thereof to travel at a definite speed proportion with that of the particular tool carried by said spindle.

2. The combination with a spindle for receiving tools of different sizes, a stepped conical gage member, each step constituting a tool speed indicating portion, and means operative with the spindle, for rotating said gage member, so that the peripheral speed of each indicating portion thereof will be in a definite proportion to that of the particular tool carried by said spindle.

3. The combination with a tool spindle for receiving tools of different sizes, a shaft disposed transversely to the tool spindle, a gage member fastened to the outer end of said shaft for rotation therewith and having a tool speed indicating portion, and means for rotating said shaft and therefore said gage member from said tool spindle, to cause the rotation of said gage member a definite speed proportion to that of the particular tool carried by said spindle.

In testimony whereof we affix our signatures in presence of two witnesses.

BENGT M. W. HANSON.
WILLARD T. SEARS.

Witnesses:
W. M. STORRS,
H. W. KILBOURNE.